United States Patent [19]

Vetter

[11] 4,033,092

[45] July 5, 1977

[54] VACUUM PACKAGING MACHINE FOR THE PRODUCTION OF PACKAGES FROM PACKAGING MATERIAL WEBS

[75] Inventor: Arthur Vetter, Gronenbach, Germany

[73] Assignee: Multivac Sepp Haggenmueller KG, Wolfertschwenden, Germany

[22] Filed: July 25, 1975

[21] Appl. No.: 599,219

[30] Foreign Application Priority Data

Aug. 1, 1974 Germany ............................ 7426251

[52] U.S. Cl. ............................ 53/112 A; 53/180 R
[51] Int. Cl.² ........................ B65B 31/04; B65B 9/02
[58] Field of Search ........... 53/22 A, 112 A, 184 R, 53/131, 180 R, 182 R; 226/109, 113

[56] References Cited

UNITED STATES PATENTS

| | | | |
|---|---|---|---|
| 811,270 | 1/1906 | Bechman | 226/113 |
| 1,933,336 | 10/1933 | Peterman | 226/113 X |
| 2,976,658 | 3/1961 | Kostup | 53/112 A |
| 3,061,984 | 11/1962 | Mahaffy | 53/112 A |
| 3,328,937 | 7/1967 | Newman et al. | 53/184 X |
| 3,343,336 | 9/1967 | Bradford | 53/184 X |
| 3,371,464 | 3/1968 | Swick | 53/112 A |
| 3,487,986 | 1/1970 | Nelson et al. | 226/113 X |
| 3,509,686 | 5/1970 | Bergestrom | 53/112 A |
| 3,515,327 | 6/1970 | Bortmas | 226/113 |
| 3,662,511 | 5/1972 | Eliasberg | 53/131 X |
| 3,743,567 | 7/1973 | Abler | 226/113 X |
| 3,805,486 | 4/1974 | Mahaffy | 53/112 A X |
| 3,808,772 | 5/1974 | Turtschan | 53/184 X |
| 3,851,441 | 12/1974 | Marchand | 53/184 X |

*Primary Examiner*—Travis S. McGehee
*Assistant Examiner*—J. Sipos
*Attorney, Agent, or Firm*—W. G. Fasse; W. W. Roberts

[57] ABSTRACT

A vacuum packaging machine is described in which two packaging material webs are used. One of these webs is fed continuously and the second web is sealed to it in a sealing station. Means are provided to reel off the second web in an intermittent way so as to allow the printing of data on the web using a simple printing apparatus.

12 Claims, 3 Drawing Figures

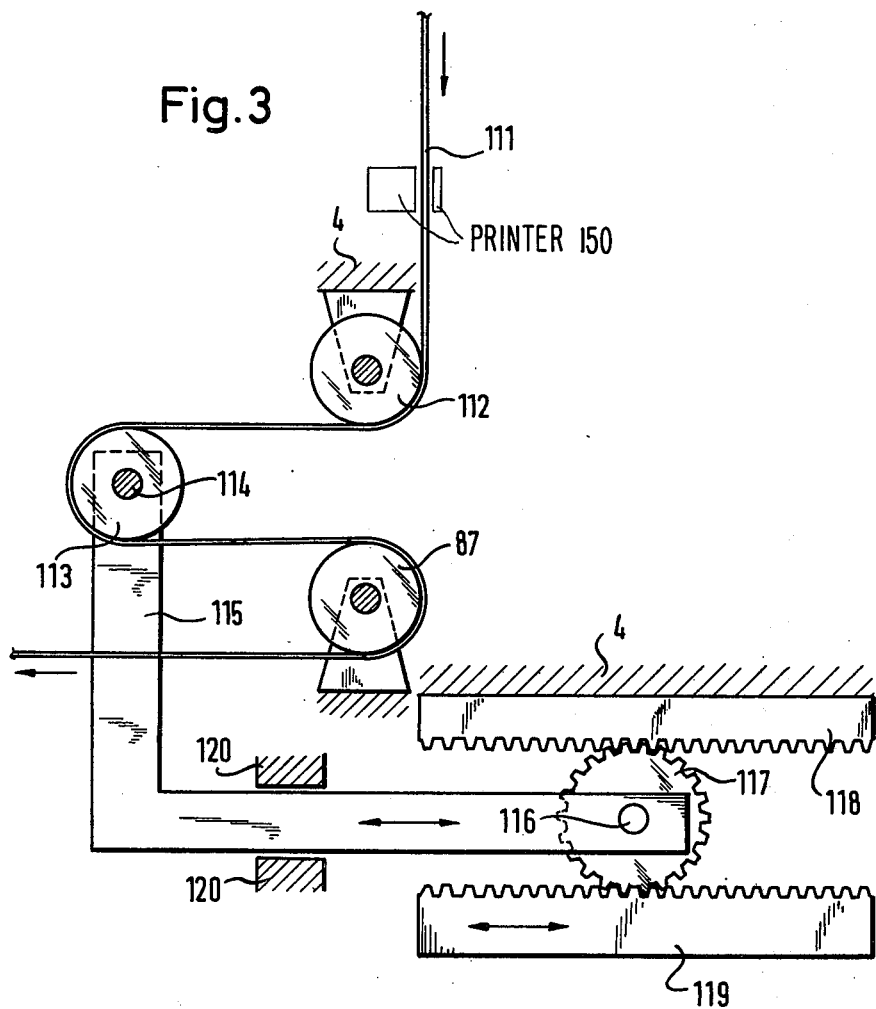

VACUUM PACKAGING MACHINE FOR THE PRODUCTION OF PACKAGES FROM PACKAGING MATERIAL WEBS

BACKGROUND OF THE INVENTION

The invention relates to a vacuum packaging machine for the production of packages from two packaging material webs with continuous feed of one of these webs.

In German patent publication DT-OS No. 2,301,217 a packaging machine is disclosed in which the lower web is reeled off a storage coil by elements gripping the web on both sides and transporting it continuously through the different working stations. The upper web is reeled off a second storage coil and, guided by guide rollers, led to the vacuum- and to the sealing station. There the upper material web and the lower web are sealed togetheralong predetermined seams. The upper web is reeled off because the portion of the upper web already sealed to the lower web is continuously pulled along by the lower web. The term continuous as used in this connection designates movement of the web being advanced during the working process in the working stations.

In vacuum packaging machines it is often necessary to print additional data on the upper foil web. With intermittent working vacuum packaging machines, as they are manufactured by the applicant, this data is flat printed during the working cycle in which the feeding of the packaging material is interrupted.

This is not possible with vacuum packaging machines with continuous web feed.

OBJECT OF THE INVENTION

It is a primary object of the invention to provide a vacuum packaging machine with continuous web feed in which data may be printed on the web using a simple printing method.

It is a further object of the invention to provide a vacuum packaging machine in which a simple printing method can be used although the upper web is moving continuously as it has been sealed to the lower web.

It is still another object of the invention to provide a vacuum packaging machine in which no complicated printing apparatus, such as rotating printing machines are necessary.

SUMMARY OF THE INVENTION

In accordance with the invention, the above objectives are achieved by a vacuum packaging machine having means to feed one of the packaging webs continuously and means to reel off the second web from the storage coil in a discontinuous way before it is sealed to the first web.

Further features and advantages of the invention are apparent from the description of the preferred embodiment taken in connection with the Figures.

BRIEF FIGURE DESCRIPTION

FIG. 3 is a schematic view of the apparatus for feeding the upper packaging web.

DETAILED DESCRIPTION OF EXAMPLE EMBODIMENT

Figure 1:
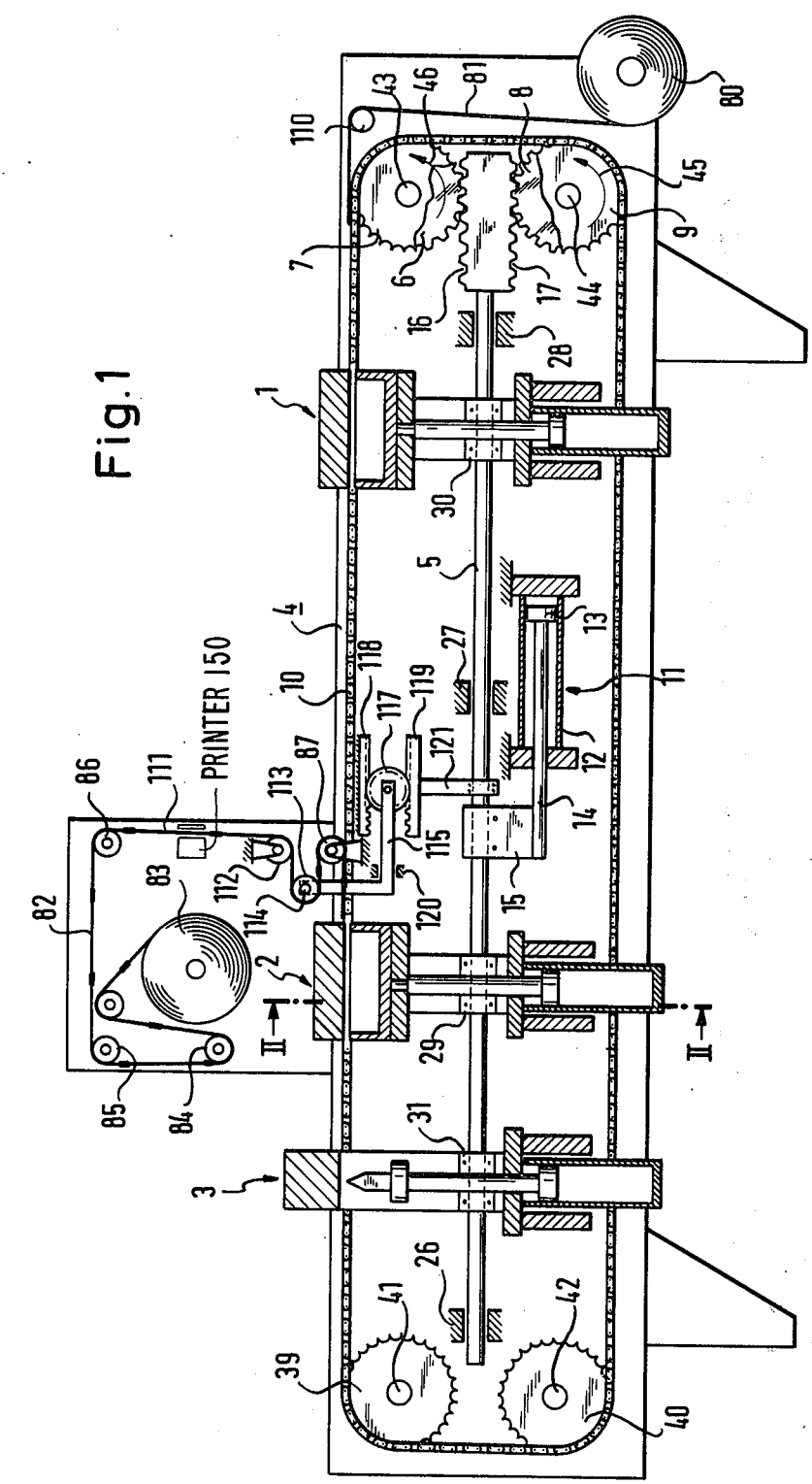
FIG. 1 is a longitudinal view of an embodiment of a vacuum packaging machine according to the invention.

The principle embodiment of the vacuum packaging machine is disclosed in FIG. 1. Three work stations, namely a deep drawing station 1, a vacuum and sealing station 2, and a separating station 3 are carried by a frame 4. A lower foil web 81 is drawn off a first roll 80, grasped by the chain gripping device 10, 10' and advanced through the individual stations. The chain gripping device is of conventional construction, for example, of the kind disclosed in German Utility Model No. 1,962,449, and is adapted to positively drive the power packaging material web in continuous movement from the right to the left, as viewed in FIG. 1. The upper web 11 is pulled by the lower web 87 during the periods when the stations 1, 2, 3 are open, since the upper web is sealed to the lower web. When the stations 1, 2, 3 are closed both webs are pressed together so that the movement of the working stations is imparted to the upper web. The bottom half of the package is drawn in deep drwing station 1 and is moved to the sealing station 2. An upper foil web 82 is drawn off a second roll 83 by means of a suitable mechanism with guide rollers 84, 85, 86, 87 and over the forms below is likewise through the sealing station led. A suitable withdrawing and guiding mechanism is, for example, disclosed in German patent application No. P 22 62 815.5.

The packages sealed in sealing station 2 are then separated from one another in separating station 3 through a suitable knife or cutting tool and, in the disclosed embodiment, discharged at the left.

Figure 2:
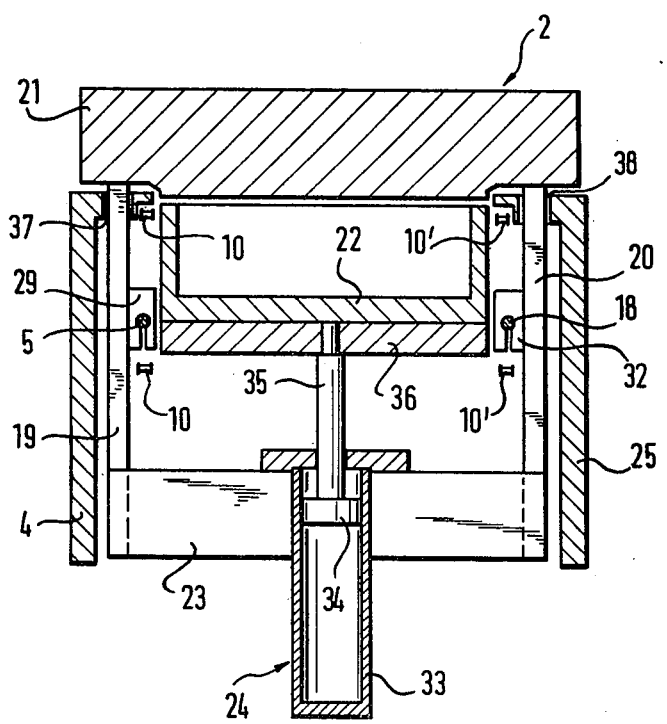
FIG. 2 is a cross sectional view of the embodiment of FIG. 1 taken along line II—II.

In furtherance of the description, a particular embodiment of the work stations and the associated moving mechanism is initially described, with the aid of FIG. 2, along with the therewith connected feed arrangement for the lower packaging material web.

The embodiment of the vacuum packaging machine shown in FIG. 1 exhibits machine frame 4, with the front side frame 25 omitted to facilitate the illustration. Rods 5, 18, are coupled with machine frame 4, 25, for reciprocation with respect thereto by journals 26, 27, 28. The rods 5, 18, are reciprocated relative to the frame by means of a feed cylinder arrangement 11 formed by a cylinder 12, a piston 13, a piston rod 14, and a connecting link 15 connected to the rods.

The rods carry work stations 1, 2, 3. The work stations are in the disclosed exemplary embodiment connected with the rods by means of clamps 29, 30, 31, 32, in the manner best seen in FIG. 2.

The construction of a work station in accordance with the inventive embodiment is best shown in FIG. 2, in which the vacuum station 2 is schematically illustrated in section. The work station includes an upper processing unit 21 and a lower processing unit 22. The upper processing unit 21 forms a strong frame comprising two side walls 19, 20 and a cross bar 23 fixedly-secured together. On the side walls 19, 20 clamps 29, 32 are fastened on the inside of the frame at the level of rods 5, 18. The clamps are, in turn, connected by means of a clamp connection with the rods 5, 18, whereby the frames are carried by the rods and with the reciprocation of the rods are reciprocated relative to machine frame 4, 25.

The lower processing unit 22 is provided beneath the upper processing unit 21. The lower processing unit 22 is reciprocated relative to the upper processing unit by means of a piston-cylinder arrangement 24 formed of cylinder 33 fixed in cross bar 23, piston 34, piston rod 35, and a lifting plate 36. The upper processing unit 21 and the lower processing unit 22 form a vacuum chamber. The chamber is connected in the usual manner with a vacuum pump by a not disclosed connecting pipe. The piston-cylinder arrangement 24 is connected with a not disclosed pressure medium input.

The vacuum station is opened and closed through the operation of piston-cylinder arrangement 24. The lifting and closing force operates only on the frame formed of the side parts 19, 20, the upper processing unit 21, and the cross bar 23, not on the machine frame. The stability of the machine is, thereby, substantially increased.

In the following, the connection between rods 5, 18, and the feed apparatus 10 is described by means of FIG. 1. The feed apparatus comprises, in the exemplary embodiment, a pair of chains 10, 10' (FIG. 2). The chain 10 shown in FIG. 1 is led about free wheeling feed sprockets 39, 40 and about sprockets 7, 9 in a closed track. The sprockets are mounted on axles 41, 42, 43, 44, respectively which are journalled in the machine frame. Rod 5 contains upper and lower toothed rack 16, 17 in the end adjacent sprockets 7, 9. In the exemplary embodiment, the two toothed racks are formed as a single unitary double tooth rack. The toothed racks engage first and second gear wheels 6, 8 behind sprockets 7, 9, shown partially broken away, in FIG. 1. The first underlying gear wheel 8 is connected with sprocket 9 by means of an over running coupling so that with a movement of rod 5 to the left, the sprocket 9 is driven in the direction indicated by the arrow 45 and with a movement of the rod 5 in the opposite direction the sprocket is not driven. The upper, second gear wheel 6 is connected with sprocket 7 with an over running coupling so that the sprocket is driven in the direction of the arrow 46 with the movement of rod 5 and rack 16 to the right. Sprocket 7 is not driven with the movement of the rod 5 to the left. In this manner chain 10 is continuously driven through the linear reciprocation of rod 5 produced by the piston-cylinder apparatus 11.

The mechanism described in connection with FIG. 1 for the rod 5 and chain 10 is similarly provided for the rod 18 and the chain 10'. It will be appreciated that the feed cylinder 11 is connected by an appropriate, not disclosed, conductor with a source of pressure. It will be further apparent that the work stations 1 and 3 contain in principle a similar construction to the work station shown in FIG. 2. Work stations 1 and 3 similarly comprise an upper processing unit which forms a frame with the side walls and a cross member, and a lower processing station which is reciprocated relative to the upper work station by means of a piston-cylinder arrangement connected to the cross member. The piston-cylinder unit is in each case connected with a pressure medium feed.

The machine works in the following manner. The packaging material web moves, in the embodiment shown in FIG. 1, from the right and with the advance of lead chain 10, 10' on both sides and in continuous movement is driven to the left by the reciprocating movement of rods 5, 18. In the first work stroke, rods 5, 18 are returned to the right, simultaneously returning the processing stations 1, 2 and 3 positively driven by rods 5 and 18, and driving chains 10, 10' via sprocket wheels 6, 7. At the same time, the lower processing units are lowered downward into the open position. In the extreme right hand position of rods 5, 18, the lower processing units move upward through the piston-cylinder arrangements and the processing units close. In the second stroke, which is directed from the right to the left in the direction of web advancement (as seen in FIG. 1), rods 5 and 18 positively move the processing units 1, 2, 3 in closed position of their upper and lower units, while simultaneously driving chains 10, 10' via sprocket wheels 8, 9. During this movement phase the receptacle is deep drawn at station 1. The actual vacuum packaging (production of the vacuum, sealing of the edges of the packaging out of the upper and lower webs) occurs at station 2 and the separation of the side by side arranged packages occurs at station 3. At the left hand end of the movement path of rods 5, 18, shown in FIG. 1, the processing units are opened through lowering of the lower unit. Therefore the work stations can freely move relative to the material webs. Through the coordinated return movement of rods 5, 18, to the right, the work stations are returned to the initial position and the work operation can begin anew. The length of the movement path of rods 5, 18 is so selected that from the release of the material web in the work station at the left dead center position of the movement path of the rods to the right dead center position of the movement path of the rods, the material web is just sufficiently moved that the work stations in each case engage not previously worked material. The length of the reciprocal movement path of the rods can be adjusted through control of the pressure medium input to the feed arrangement 11. The feed length of the material web is in each case equal to the length of two strokes of the work cycle.

In a practical embodiment the feed arrangement 11 is positioned in the middle between both rods 5, 18 so that it is connected by connection element 15 with both rods 5, 18 and so that the rods are simultaneously moved.

While both packaging material webs are simultaneously moved at the same speed through the processing stations 1, 2, 3 in a continuous parallel movement, only the lower web 81 is continuously reeled off from its storage coil 80. The upper web 111 is discontinuously reeled off its storage coil 83, so that during the step periods of the upper web, data may be printed thereon by means of a suitable flat printing device, such as the printing device 150 between the rolls 86 and 112. In order to transform the discontinuous movement of the upper web to continuous movement, movable guide means are provided which will be described hereinafter.

As illustrated in FIGS. 1 and 3 the upper packaging web is guided by rollers 112 and 87 mounted on frame 4. Between these rollers the web is guided by a deflection roller 113 mounted on shaft 114 of a L-shaped support 115. This support 115 is movably mounted in frame 4 by a friction bearing 120. On the second arm of the support 115 a gear wheel 117 is mounted on shaft 116. This gear wheel 117 engages toothed rack 118 fixed to frame 4 as well as toothed rack 119 which is connected to rod 5 by a suitable connection member 121.

After closing the working stations 1, 2, 3 the lower web 81 and the upper web 111, which have been sealed together in the sealing station 2, are moved on along with the working stations to the left. The upper web is thus continuously pulled through the processing stations, since it is sealed to the lower web. At the same time the lower tooth rack 119 is moved by the connection member 121 and rod 5 to the left. The combined effect of toothed racks 118, 119 and engaged gear wheel 117 results in a movement of L-shaped support 115 and deflection roller 113 of half of the length of the movement of rod 5 to the left. In addition to being pulled by the lower web, the upper web is thus reeled off from its storage coil an additional length corresponding to twice the stroke of deflection roller 113. In this way the upper web 111 is reeled off from the beginning till to the end of the movement of the working stations from the right to the left by double the length of the movement of the working stations, because it has been sealed to the lower web and because of the movement of the deflection roller 113 to the left. When the working stations are returned to the right, the deflection roller 113 on support 115 is again returned half the way of the working stations.

Therefore, the web already reeled off the storage coil 83 is released and may be moved along together with the continuously moving lower web during this working cycle, without the web 111 above the roller 112 having to be moved. As the upper web 111 is not moving during this working cycle, data may be printed on it using simple printing apparatus. This may be accomplished between the rollers 85 and 86 or between the guide rollers 86 and 112.

While the above description refers to continuous movement of the chains 10 and 10', it is, of course, apparent that, due to the driving of the chains by the reciprocating rods 5, 18 there may be a momentary stopping of the chains at the end positions of the rods, when the direction of motion of the rods changes. This stoppage of the chains 10, 10' is, of course, only momentary, and of insufficient duration to effect processing of the webs, and the movement of the chains is thereby substantially continuous. For the purposes of the present invention disclosure, then the term "continuous" includes this substantially continuous movement.

While there have been illustrated and described several embodiments of the present invention, it will be understood that various changes and modifications may occur to those skilled in the art. It is intended to cover all modifications and equivalents within the scope of the application of the appended claims.

What is claimed is:

1. A vacuum packaging machine for the production of packages from first and second packing material webs, wherein said second web is wound on a storage roll, comprising at least one working station and one sealing station, including means reciprocating said stations through a work cycle, means for feeding said first web to said working station and thence to said sealing station in a continuous manner, means operatively connecting said station reciprocating means to said first web feeding means, means for intermittently reeling off said second web from said storage roll, comprising movable guide means for converting the intermittent movement of the reeled off second web into a movement of a continuous manner feeding into said sealing station for sealing the second web to said first web, whereby the discontinuous movement of said second web is transformed into a movement of a continuous manner, and means operatively connecting said movable guide means to said station reciprocating means for moving said second web downstream of said movable guide means in unison with said first web.

2. The vacuum packaging machine according to claim 1, wherein said means reciprocating said stations perform successive operating cycles each including a first cycle portion and a second cycle portion, said intermittently reeling off means comprising means for reeling off a length of said second web during said first cycle portion, said length of said second web corresponding to the feed length of said first web during one complete operating cycle, and substantially inhibiting reeling off of said second web during said second cycle portion.

3. The vacuum packaging machine according to claim 1, further comprising a first stationary guide and a second stationary guide arranged for cooperation with said movable guide means which are arranged between the first mentioned guides, and means for varying the distance between the movable guide means and the stationary guides.

4. The vacuum packaging machine according to claim 3, wherein said means for varying comprises means for moving said movable guide means half the distance the first web is moved and in the same direction as said first web is moved during said first cycle portion, and for also moving said movable guide means the same half distance in a direction opposite to the direction of movement of said first web in said second cycle portion of said operating cycle.

5. The vacuum packaging machine according to claim 1, wherein said reciprocating means comprise rod means, said sealing station and said working station being mounted on said rod means for reciprocating said stations, whereby said sealing station and working station are moved back and forth with said rod means, said movable guide means comprising a connection member fixed to said rod means and carrying a first toothed rack, a second toothed rack fixed to the machine frame, a gear wheel engaging said first and second racks, a deflection roller connected to said gear wheel, and wherein the second web is positioned to be reeled off from said roll by the roller only during the movement of the rod means in one direction.

6. The vacuum packaging machine according to claim 5, comprising a double toothed rack fixed to said rod means, two gear wheels mounted to engage separate racks of said double toothed rack, a pair of sprockets, over running coupling means connecting said sprockets to separate gear wheels, and drive means coupled to said sprockets for feeding said first web to said stations, whereby said reciprocating rod means feeds said first web in a continuous manner and feeds said second web intermittently.

7. The vacuum packaging machine of claim 1, further comprising flat printing means mounted to print on said intermittently dereeled second web when said second web is stationary between advancing steps.

8. The vacuum packaging machine of claim 1, further comprising a supply roller for said second web, and wherein said means for intermittently reeling of said second web from said supply roller comprises first and second stationary rollers, a movable roller between said first and second stationary rollers, said second web being directed from said supply roller around said first stationary roller, thence around said movable roller, and thence around said second stationary roller, and means for cyclically moving said movable roller.

9. The vacuum packaging machine of claim 8, comprising means for reciprocating said working station, said sealing station and said movable roller in a direction parallel to a given direction.

10. The vacuum packaging machine of claim 9, wherein said means for reciprocating comprises means for moving said movable roller a distance half as great as the distance of movement of said working and sealing stations.

11. The vacuum packaging machine of claim 10, wherein said means for feeding said first web comprises means for moving said first web at the same rate of movement as said working station and said sealing station.

12. The vacuum packaging machine of claim 1, comprising means for reciprocating said movable guide means and means for driving said feeding means of said first web, said reciprocating means of said movable guide means being operatively coupled to said driving means of said feeding means to achieve a synchronous operation of said reciprocating means and said feeding means.

* * * * *